(12) United States Patent
Imai

(10) Patent No.: US 10,793,018 B2
(45) Date of Patent: Oct. 6, 2020

(54) SERVER, VEHICLE, AND METHOD FOR PROVIDING CHARGING INFORMATION

(71) Applicant: TOYOTA JIDOSHA KABUSHIKI KAISHA, Toyota-shi, Aichi-ken (JP)

(72) Inventor: Tsutomu Imai, Inazawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/424,900

(22) Filed: May 29, 2019

(65) Prior Publication Data

US 2020/0016993 A1  Jan. 16, 2020

(30) Foreign Application Priority Data

Jul. 10, 2018 (JP) ................. 2018-130789

(51) Int. Cl.
*B60L 58/10* (2019.01)
*B60L 53/66* (2019.01)

(52) U.S. Cl.
CPC ....... *B60L 53/665* (2019.02); *B60L 2240/622* (2013.01); *B60L 2250/16* (2013.01)

(58) Field of Classification Search
CPC ............. B60R 1/00; B60R 2300/804; B60R 2300/8086; G01C 11/00; G01C 21/365; G02B 2027/0138; G02B 2027/014; G02B 27/0101; G06K 9/00798; G06K 2209/27; G06K 9/20; G06Q 30/02; G06Q 30/0201; G06Q 30/0203; G06Q 30/0204; G06Q 30/0282; G06Q 30/0631; G06T 11/00; G06T 3/00; G06T 7/70; H04L 67/12; H04L 12/28; H04L 41/0681; H04L 43/087; H04L 43/16; H04W 36/0016; H04W 36/10; H04W 36/165; H04W 36/26; H04W 60/00; H04W 84/005; B60W 2050/021; B60W 2050/0215; B60W 2050/0295; B60W 30/14; G01B 11/24; G01B 11/275; G01J 5/62; G01S 13/42; G01S 13/5242;

(Continued)

(56) References Cited

U.S. PATENT DOCUMENTS 4,591,777 A * 5/1986 McCarty ............... H02J 7/0013
                                                  15/DIG. 1
2015/0294329 A1* 10/2015 Saito ....................... B60L 53/14
                                                  705/7.31

(Continued)

FOREIGN PATENT DOCUMENTS

JP 2010-175492 A  8/2010
JP 2011-024335 A  2/2011
JP 2014-225167 A  12/2014

*Primary Examiner* — Daniel Previl
(74) *Attorney, Agent, or Firm* — Oliff PLC

(57) ABSTRACT

A server calculates, for each of a plurality of vehicles, a total number of chargers within an accessible range of a vehicle to calculate a reduced number so that the greater the total number of chargers is, the less the reduced number is, the reduced number representing a likelihood that the vehicle would arrive at each of the chargers. The server calculates, for each of the at least one charger, an effective number of vehicles which may use a charger to conduct external charging, by summing reduced numbers. The server calculates an index indicating a potential demand for external charging at the at least one charger based on the effective number.

10 Claims, 13 Drawing Sheets

(58) Field of Classification Search
CPC ...... G01S 13/582; G01S 13/89; G01S 15/931;
G01S 1/02; G01S 1/72; G01S 2007/2883;
G01S 2015/939; G01S 7/288; G06F
16/284; G06F 16/29; G06F 16/444; G06F
16/51; G06F 16/95; G06F 16/9537; G07F
17/3237; G07F 17/3276; G07F 17/3295;
G08B 13/1627; G08B 13/19; G08G
1/015; H01Q 21/24; H01Q 25/001; H04N
7/183; Y10S 250/01
USPC ....... 340/455, 463, 468, 472, 478, 488, 525,
340/539.22, 539.23, 539.3, 545.3, 571
See application file for complete search history.

(56) References Cited

U.S. PATENT DOCUMENTS

2017/0282740 A1\* 10/2017 Ichikawa .............. H02J 7/0045
2018/0018007 A1    1/2018 Dorn et al.

\* cited by examiner

FIG.4

<USE HISTORY OF CHARGER A (THIS MONTH)>

| | | USE TIME [min] | | | | | |
|---|---|---|---|---|---|---|---|
| | | 1 | 2 | 3 | 4 | 5 | ... |
| | | (WED) | (THU) | (FRI) | (SAT) | (SUN) | |
| | | WEEKDAY | WEEKDAY | HOLIDAY | WEEKEND | WEEKEND | |
| MIDNIGHT TO 4 AM | LATE NIGHT TO EARLY MORNING | 20 | 10 | 20 | 20 | 50 | |
| 4 AM TO 8 AM | EARLY MORNING TO MORNING | 50 | 20 | 10 | 20 | 0 | |
| 8 AM TO NOON | MORNING TO NOON | 100 | 100 | 150 | 100 | 130 | |
| NOON TO 4 PM | NOON TO EVENING | 80 | 100 | 200 | 200 | 180 | |
| 4 PM TO 8 PM | EVENING TO NIGHT | 90 | 110 | 180 | 150 | 150 | |
| 8 PM TO MIDNIGHT | NIGHT TO LATE NIGHT | 30 | 20 | 40 | 60 | 60 | |

FIG.5

<USE HISTORY OF CHARGER A (TOTAL SUM)>

| | | USAGE RATE [%] | | |
|---|---|---|---|---|
| | | WEEKDAY | HOLIDAY WEEKEND | TOTAL |
| MIDNIGHT TO 4 AM | LATE NIGHT TO EARLY MORNING | 5 | 9 | 6 |
| 4 AM TO 8 AM | EARLY MORNING TO MORNING | 6 | 7 | 6 |
| 8 AM TO NOON | MORNING TO NOON | 35 | 48 | 39 |
| NOON TO 4 PM | NOON TO EVENING | 35 | 68 | 46 |
| 4 PM TO 8 PM | EVENING TO NIGHT | 26 | 48 | 33 |
| 8 PM TO MIDNIGHT | NIGHT TO LATE NIGHT | 22 | 27 | 24 |

FIG.7

|  | EFFECTIVE NUMBER N | USAGE RATE U [%] | CONGESTION INDEX I |
|---|---|---|---|
| CHARGER A | 1.25 | 35 | 0.44 |
| CHARGER B | 0.25 | 40 | 0.10 |
| CHARGER C | 0.75 | 70 | 0.53 |
| CHARGER D | 0.50 | 60 | 0.30 |
| CHARGER E | 0.25 | 50 | 0.13 |
| CHARGER F | 1.00 | 25 | 0.25 |

FIG.9A

| CONGESTION INDEX I | CLASSIFICATION BY COLOR |
|---|---|
| $I4 \leq I$ | RED |
| $I3 \leq I < I4$ | ORANGE |
| $I2 \leq I < I3$ | YELLOW |
| $I1 \leq I < I2$ | GREEN |
| $0 \leq I < I1$ | BLUE |

FIG.9B

| RELATIVE CONGESTION INDEX P [%] | CLASSIFICATION BY COLOR |
|---|---|
| $90 \leq P \leq 100$ | RED |
| $70 \leq P < 90$ | ORANGE |
| $50 \leq P < 70$ | YELLOW |
| $30 \leq P < 50$ | GREEN |
| $0 \leq P < 30$ | BLUE |

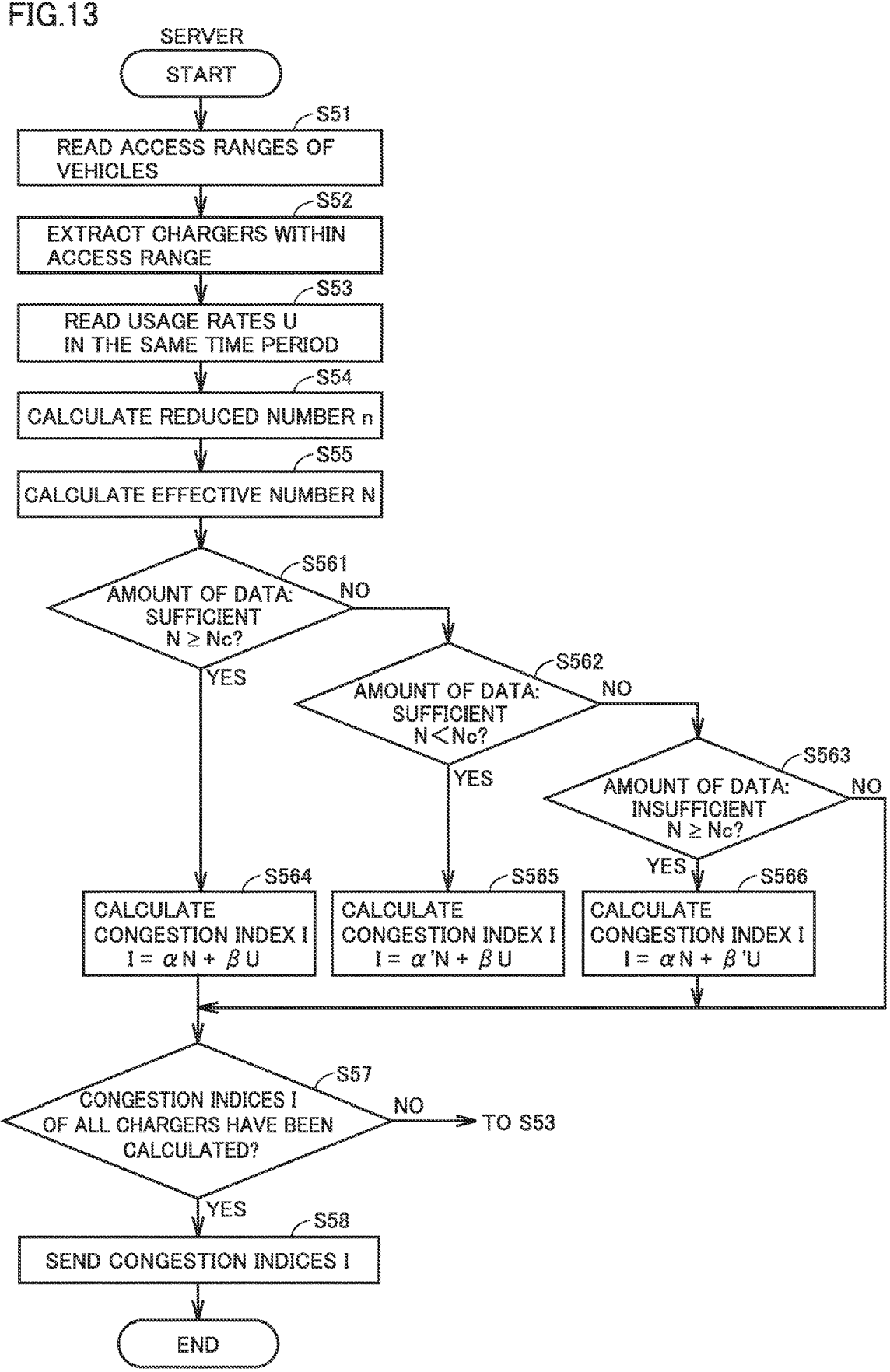

SERVER, VEHICLE, AND METHOD FOR PROVIDING CHARGING INFORMATION

This nonprovisional application is based on Japanese Patent Application No. 2018-130789 filed on Jul. 10, 2018 with the Japan Patent Office, the entire contents of which are hereby incorporated by reference.

BACKGROUND

Field

The present disclosure relates to a server, a vehicle, and a method for providing charging information, and, more particularly, to a server which provides multiple vehicles with charging information for external charging, a vehicle which is provided with the charging information from the server, and a method for providing the charging information.

Description of the Background Art

In recent years, vehicles having external charging capabilities (specifically, electric vehicles, plug-in hybrid vehicles, etc.) are increasingly popular. The external charging refers to charging a power storage device, mounted on a vehicle, with power supplied from a source external to the vehicle.

In general, while fueling of gasoline or the like takes time as short as a few minutes, external charging takes long (typically, tens of minutes to a few hours). Therefore, when a user's vehicle needs external charging by a charger of the go (also called a charging station) and that charger is in use by another vehicle, the user's vehicle is unable to start external charging until the external charging by the another vehicle is completed.

In a situation where the user do not know whether a charger is available (whether the charger is not in use) unless he/she goes to the charger, even if the user gets to the charger, the charger may be in use by another vehicle. In such a case, the user has to wait until the external charging for the other vehicle is completed. Alternatively, due to the user's schedule, the user may not be able to wait until the external charging for the other vehicle is completed, and may even have to look for another charger.

To improve the user conveniences, it is desirable that a user is able to ascertain, without having to go to chargers, a charger to select to start external charging immediately. Therefore, for example, the charger disclosed in Japanese Patent Laying-Open No. 2011-024335 provides a user with a measure of charging wait time.

SUMMARY

According to Japanese Patent Laying-Open No. 2011-024335, a situation is assumed in which one vehicle (electric vehicle) is charging with one charger, and another vehicle is await for charging. In this situation, in order for the user to determine whether to use the charger, the charging wait time is sent from the charger to the user's vehicle. The charging wait time includes a charging time (remaining charging time) of the vehicle currently being charged, and a charging time (expected charging time) for the vehicle waiting for charging (e.g., see paragraphs to of Japanese Patent Laying-Open No. 2011-024335).

Japanese Patent Laying-Open No. 2011-024335 also considers the presence of other vehicles, waiting for charging, to calculate the charging wait time. The vehicles waiting for charging refer to those which have indicated an intention for external charging, such as performing an operation to reserve external charging by that charger.

However, considering a wider range around a charger, for example, a few kilometers to tens of kilometers range, there may be other vehicles which may conduct external charging, while are not waiting for charging for now (i.e., have not indicated an intention for external charging). Such vehicles (so to say, a potential demand for external charging) can compete with the user's vehicle for selection of a charger, which is, however, not considered in Japanese Patent Laying-Open No. 2011-024335.

The present disclosure is made to solve the above problem, and has an object to provide appropriate information for a user to determine a charger desirable to select to externally charge the user's own vehicle.

(1) A server according to a certain aspect of the present disclosure provides multiple vehicles, each mounted with a power storage device, with charging information for external charging. The server includes a communication device configured to communicate with multiple vehicles, and a circuitry configured to generate charging information. To provide the charging information to a target vehicle, among the multiple vehicles, the circuitry is configured to obtain an accessible range, for the target vehicle, which is determined by the current location of the target vehicle and the power stored in a power storage device for the target vehicle, to extract at least one charger within the obtained accessible range. For each of the multiple vehicles, the circuitry is configured to calculate a total number of chargers within the accessible range of a vehicle to calculate a reduced number so that the greater the total number of chargers is, the less the reduced number is, the reduced number representing a likelihood that the vehicle would arrive at each of the chargers. For each of the at least one charger, the circuitry is configured to calculate an effective number of vehicles which may use a charger to conduct external charging, by summing reduced numbers. The circuitry is configured to calculate an index indicating a potential demand for external charging at each of the at least one charger based on the effective number, and provide the index to the target vehicle.

In the above configuration (1), the effective number of vehicles, which may use a charger within the access range for the target vehicle (a certain user's vehicle) to conduct external charging, is calculated. Then, based on the effective number, the index indicating a potential demand for external charging at that charger is calculated. As such, by considering the potential demand for external charging, the congestion level of the charger and the charging wait time can be estimated more accurately. Thus, according to the above configuration (1), appropriate information can be provided which is for the user to determine a charger desirable to select.

(2) The server further includes a database storing use history of the at least one charger. The circuitry calculates the index based on the effective number and the use history.

According to the above configuration (2), the index indicating a potential demand for external charging at the charger is calculated based on the use history of the charger, in addition to the effective number. Use of the use history of the charger (e.g., use history for the same day of the week or the same time period) allows even more accurate estimation of the congestion level of the charger and the charging wait time.

(3) The use history includes a usage rate which is a rate of a use period for each of the at least one charger to a period classified for each predetermined condition. The circuitry calculates the index based on a weighed value of the effective number by a first coefficient and a weighed value of the usage rate by a second coefficient.

(4) A standard range is provided for the usage rate includes, the standard range representing a range of usage rate expected from the effective number. The circuitry obtains the standard range from the effective number, and when the usage rate is greater than a maximum value of the standard range, the circuitry weighs the usage rate by the second coefficient greater than when the usage rate is within the standard range.

(5) A standard range is provided for the usage rate, the standard range representing a range of the usage rate expected from the effective number. The circuitry obtains the standard range from the effective number, and when the usage rate is less than a minimum value of the standard range, the circuitry weighs the effective number by the first coefficient greater than when the usage rate is within the standard range.

As described below in more detail, if the usage rate of the charger is greater than the maximum value of the standard range, stated differently, if the usage rate is significantly higher than a usage rate typically expected from the effective number, there may be many vehicles (unregistered vehicles) around the charger that do not communicate with the server and the charger may have been used by those unregistered vehicles. According to the above configurations (3) and (4), in such a case, the usage rate is regarded more important than the effective number by weighing the usage rate by the second coefficient greater than when the usage rate is within the standard range. Accordingly, the index is calculated primarily based on the usage rate, allowing the past use history to be more largely reflected on the index. As a result, the accuracy in calculation of the index improves, allowing even more accurate estimation of the congestion level of the charger and the charging wait time.

Conversely, when the usage rate of the charger is less than the minimum value of the standard range, stated differently, when the usage rate is significantly lower than the usage rate typically expected from the effective number, the usage rate of the charger may be too low because, for example, the charger has been installed relatively recently and the presence of the charger may not be well recognized by users. According to the above configurations (3) and (5), in such a case, the effective number is regarded more important than the usage rate by weighing the effective number by the first coefficient greater than when the usage rate is within the standard range. Accordingly, the index is calculated primarily based on the effective number, allowing the effective number to be more largely reflected on the index. As a result, the accuracy in calculation of the index improves, allowing even more accurate estimation of the congestion level of the charger and the charging wait time.

(6) When the period from which the usage rate data is obtained is shorter than a predetermined period, the circuitry weighs the effective number by the first coefficient greater than when the period is longer than the predetermined period. (7) When the effective number is less than a predetermined number, the circuitry weighs the usage rate by the second coefficient greater than when the effective number is greater than the predetermined number.

According to the above configurations (6) and (7), when the period from which the usage rate is obtained falls below the predetermined period, the amount of the usage rate data may not be sufficient. Thus, the weight on the effective number by the first coefficient is increased. Conversely, if the effective number falls below a predetermined amount, the amount of data of the effective number may be insufficient. Thus, the weight on the usage rate by the second coefficient is increased. By doing so, among the usage rate and the effective number for the charger, a parameter that has a greater amount of data and higher reliability has a greater impact on the index, thereby improving the accuracy in calculation of the index. Thus, the congestion level of the charger and the charging wait time can be estimated even more accurately.

(8) A vehicle according to another aspect of the present disclosure is provided, by the server, with charging information for external charging. The vehicle includes a power storage device, and a communication device configured to communicate with the server. The vehicle is configured to send, to the server, information indicating power stored in the power storage device and the current location of the vehicle. The server is configured to obtain an accessible range for the vehicle which is determined by the power and the current location of the vehicle, to extract at least one charger within the obtained accessible range. For each of multiple vehicles, the server is configured to calculate a total number of chargers within the accessible range for a vehicle to calculate a reduced number so that the greater the total number of chargers is, the less the reduced number is, the reduced number representing a likelihood that the vehicle would arrive at each of the chargers. For each of the at least one charger, the server is configured to calculate an effective number of vehicles which may use a charger to conduct external charging, by summing reduced numbers. The server is configured to calculate an index indicating a potential demand for external charging at each of the at least one charger based on the effective number, and send the index to the vehicle. The vehicle further includes a notification device configured to notify the index to the user of the vehicle.

According to the above configuration (8), the user of the vehicle is allowed to know, by the notification device, the magnitude of the index calculated in the same manner as the above configuration (1). This allows the user to select a desired charger, based on the magnitude of the index.

(9) The notification device includes a display configured to display each of the at least one charger in an icon according to the magnitude of the index of each of the at least one charger.

According to the above configuration (9), the magnitude of the index is visualized, for example, by displaying an icon having a color according to the magnitude of the index. This allows the user to more readily know the magnitude of the index.

(10) A method for providing charging information according to another aspect of the present disclosure provides multiple vehicles, each mounted with a power storage device, with charging information for external charging. The method for providing charging information includes a first step, a second step, a third step, and a fourth step. The first step is, in order to provide a target vehicle, among multiple vehicles, with the charging information, obtaining an accessible range for the target vehicle, the accessible range being determined by power stored in a power storage device included in the target vehicle and the current location of the target vehicle, to extract at least one charger within the obtained accessible range. The second step is calculating, for each of the multiple vehicles, a total number of chargers within an accessible range for the vehicle to calculate a reduced number so that the greater the total number of chargers is, the less the reduced number is, the reduced number representing a likelihood that the vehicle would arrive at each of the chargers. The third step is calculating an effective number of vehicles which may use a charger to conduct external charging, by summing reduced numbers. The fourth step is calculating an index indicating a potential demand for external charging at each of the at least one charger based on the effective number, and provides the index to the target vehicle.

According to the above method (10), as with the above configuration (1) or (8), appropriate information can be provided which is for the user to determine a charger desirable to select.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 4 is a diagram illustrating example use history information of a charger.

FIG. 5 is a diagram for illustrating usage rates of the charger.

FIG. 7 is a diagram for illustrating a method of calculation of congestion indices of the chargers.

FIG. 9A is a first diagram for illustrating a method of display of congestion indices on a display included in a navigation device.

FIG. 9B is a second diagram for illustrating a method of display of congestion indices on the display of the navigation device.

FIG. 13 is a flowchart showing a charger-selection assist process according to Variation 2 of Embodiment 2.

DESCRIPTION OF THE PREFERRED EMBODIMENTS

In the embodiments described below, "charging information" is provided for each of multiple vehicles. The charging information indicates a charger desirable to select. A system which provides the charging information will be referred to as a "charging information providing system," and the configuration thereof will be described below in detail, with reference to the accompanying drawings. Note that the same reference signs are used to refer to the same or like parts, and the description thereof will not be repeated.

Embodiment 1

<Configuration of Charging Information Providing System>

Figure 1:
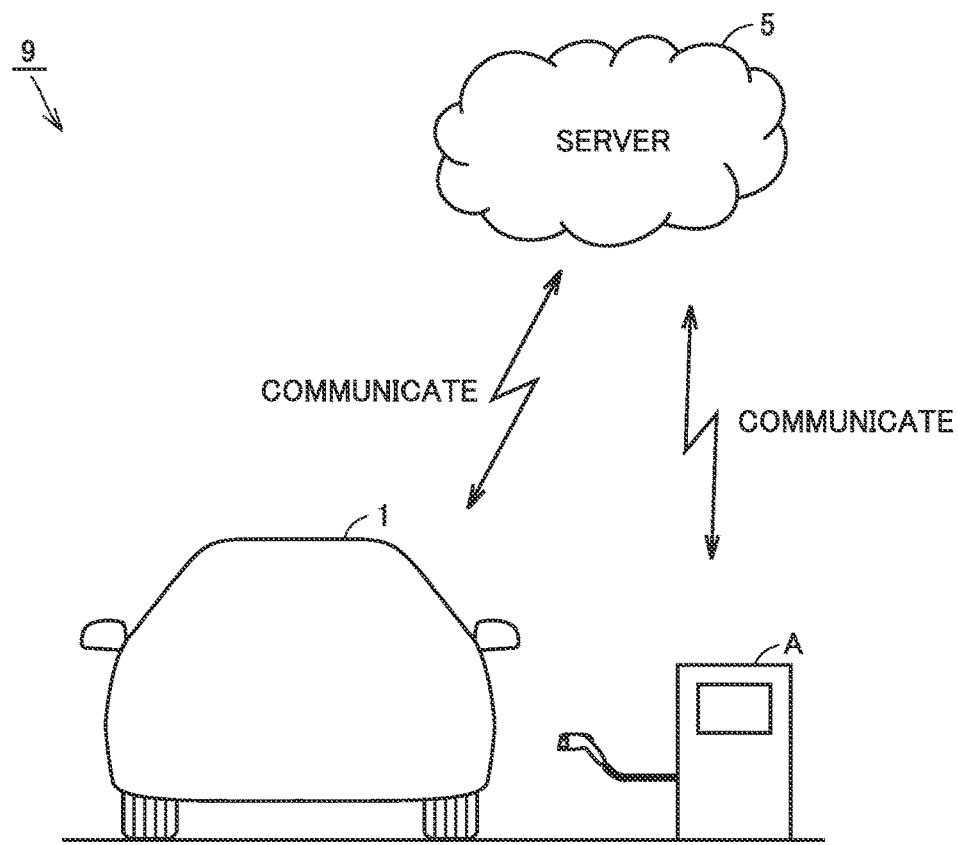
FIG. 1 is a diagram schematically showing an overall configuration of a charging information providing system according to Embodiment 1.
Figure 1:
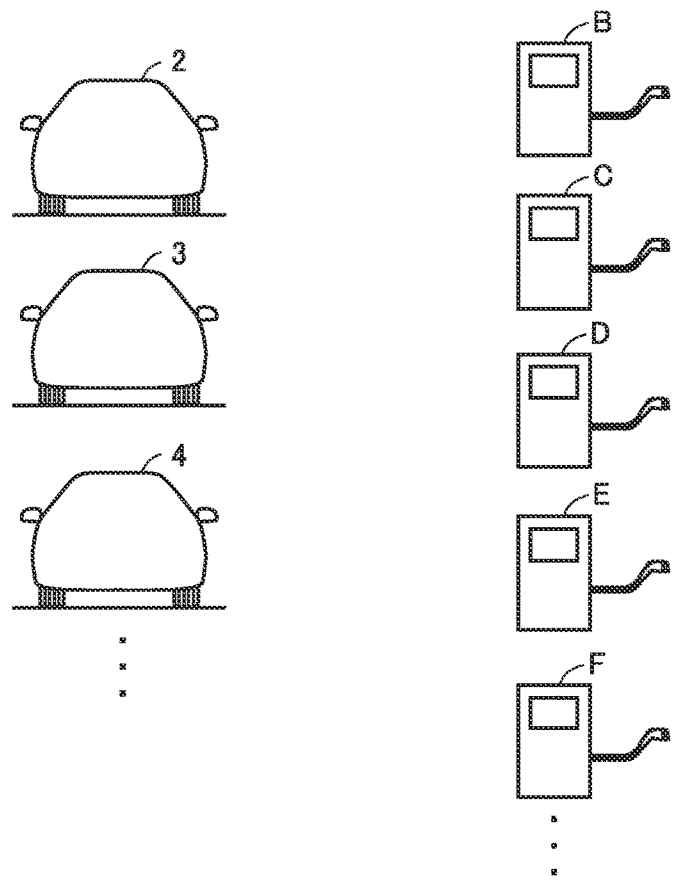

FIG. 1 is a diagram schematically showing an overall configuration of a charging information providing system according to Embodiment 1. A charging information providing system 9 includes multiple vehicles 1 to 4 and a server 5. Vehicles 1 to 4 are, for example, electric vehicles each mounted with a battery 110 (see FIG. 2). Vehicles 1 to 4 are each configured to charge (plug-in charge) battery 110 with power supplied from any of chargers A to F.

While the embodiment will be described with reference to charging information providing system 9 including four vehicles 1 to 4 for the sake of brevity, it should be note that, in practice, charging information providing system 9 can include more vehicles (e.g., several thousands to several hundreds of thousands of vehicles). Moreover, more than 6 chargers may be provided.

Vehicle 1 and server 5 are configured to bidirectionally communicate with each other. The same is true for between the other vehicles 2 to 4 and server 5. With this, server 5 receives and transmits necessary information from and to vehicles 1 to 4.

Furthermore, charger A and server 5 configured to bidirectionally communicate with each other. The same is true for the other chargers B to F. With this, server 5 collects information about use histories of chargers A to F. This information will be described with reference to FIGS. 4 and 5.

Figure 2:
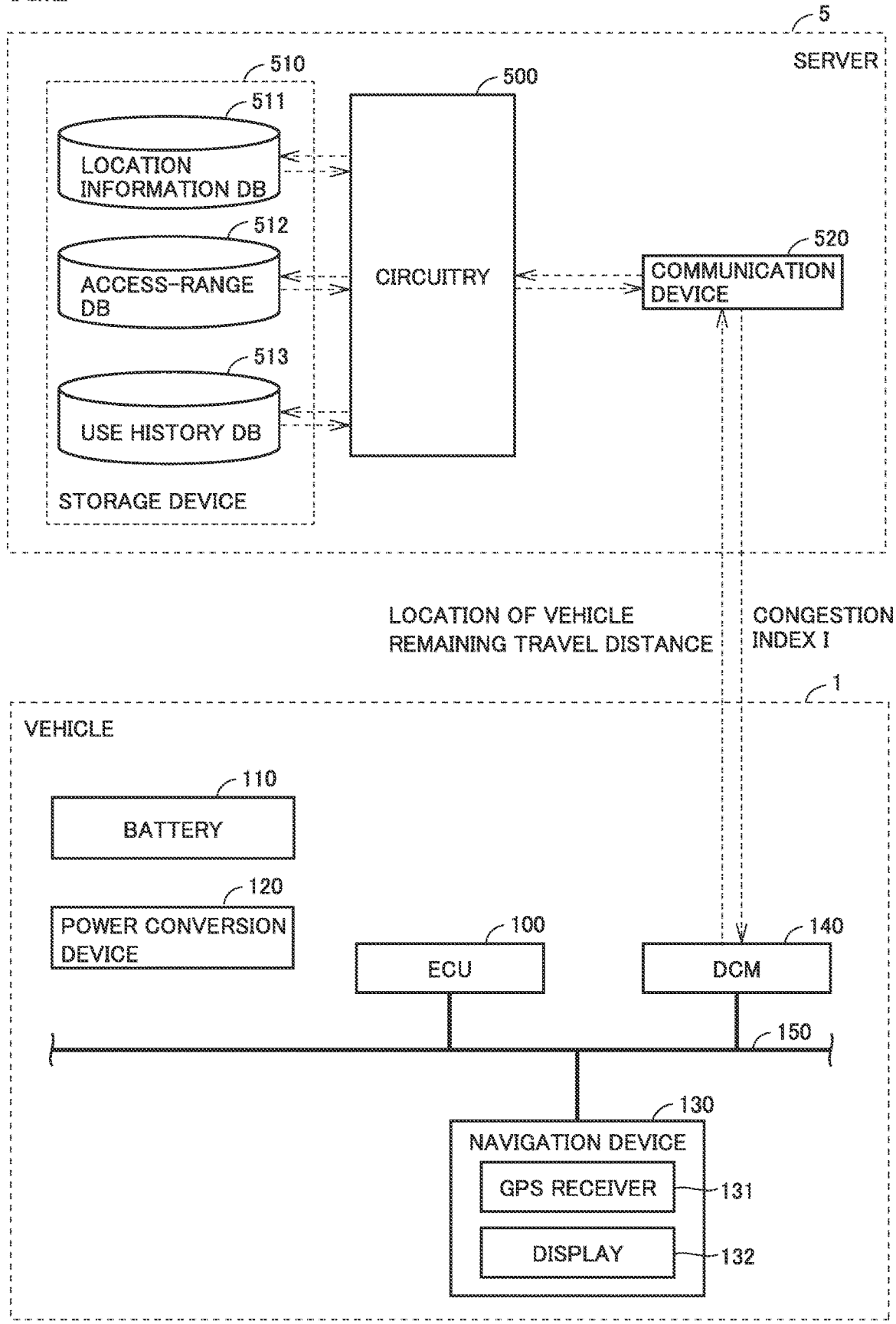
FIG. 2 is a diagram showing more details of the configuration of the charging information providing system.

FIG. 2 is a diagram showing more details of the configuration of charging information providing system 9. Vehicles 2 to 4 basically have the same configuration as vehicle 1. Therefore, FIG. 2 representatively describes the configuration of vehicle 1.

Vehicle 1 includes an electronic control unit (ECU) 100, battery 110, a power conversion device 120, a navigation device 130, and a communication module 140. ECU 100, navigation device 130, and communication module 140 are connected to one another by a wired, vehicle network 150, such as a controller area network (CAN).

Battery 110 is a battery pack configured with multiple cells (not shown). Each cell is a secondary battery, such as a lithium-ion secondary battery or a nickel-metal hydride battery. Battery 110 supplies, via a power control unit (PCU) (not shown), a motor generator (not shown) with power for driving the motor generator. The motor generator is also able to generate power by regenerative braking. Alternating-current (AC) power generated by the motor generator is converted into direct-current (DC) power by the power control unit and the DC power is charged in battery 110.

Power conversion device 120 converts the power supplied from chargers A to F into DC power having a voltage that is chargeable in battery 110, according to a control signal from ECU 100.

Navigation device 130 includes a global positioning system (GPS) receiver 131 for identifying the location of vehicle 1, based on a radio wave from an artificial satellite (not shown), and a touch panel display 132 which receives various user operations. Navigation device 130 performs various navigation processes for vehicle 1, using the positional information (hereafter, also referred to as "GPS information") of vehicle 1 identified by GPS receiver 131.

More specifically, navigation device 130 displays, on display 132, a road map around vehicle 1 based on the GPS information of vehicle 1 and road map data stored in a memory (not shown). The current location of vehicle 1 and locations of one or more chargers are overlapped on the road map. Navigation device 130 also receives a user operation of selecting any charger among the one or more chargers displayed on display 132. Navigation device 130 may guide a recommended route from the current location of vehicle 1 to the charger selected by the user. Note that navigation device 130 corresponds to a "notification device" according to the present disclosure.

Communication module 140 is an in-vehicle data communication module (DCM) and configured to allow ECU 100 and server 5 to bidirectionally communicate with each other.

ECU 100 is configured with a central processing unit (CPU), a memory, an I/O port, and a timer (none of which is shown). ECU 100 controls each device in vehicle 1 based on various sensors (not shown) measurements and programs stored in the memory so that vehicle 1 is brought into a desired state.

Server 5 includes a circuitry (processing unit) 500 which is, for example, an application server, a storage device 510, and a communication device 520. Storage device 510 includes a location information database 511, an access-range database 512, and a use history database 513.

Location information database 511 stores GPS information of vehicles 1 to 4. The GPS information of vehicles 1 to 4 are periodically sent from vehicles 1 to 4 to server 5. Location information database 511 stores the location information of chargers A to F. A new charger may be installed or an existing charger may be removed from service. Thus, the location information of chargers stored in location are periodically kept up-to-date by an administrator of information database 511. Note that location information database 511 may be composed of two databases, that is, a database storing the GPS information of vehicles 1 to 4, and a database storing the location information of chargers A to F.

Access-range database 512 stores information (access range information) about accessible ranges for vehicles 1 to 4, based on the current locations and remaining travel distances (possible travel distances) of vehicles 1 to 4. Use history database 513 stores information (use history information) about usage rates of chargers A to F for each time period. These information will be described below in detail. Note that use history database 513 corresponds to a "database" according to the present disclosure.

Communication device 520 is configured to be capable of bidirectional data communications with communication module 140 mounted on the vehicle 1. Although not shown, communication device 520 is configured to be capable of bidirectional data communications also with communications modules included in chargers A to F.

Circuitry 500 collects information (see FIG. 3) about use histories of chargers A to F via communication device 520, and calculates from the collected information usage rates (see FIG. 4) of chargers A to F for each time period. Circuitry 500 then stores the information about the calculated usage rates into use history database 513. Furthermore, examples of main controls performed by circuitry 500 include a "select assist process" for assisting the user in selecting a charger for conducting plug-in charging. The charger-selection assist process will be described below in detail.

<Calculating Usage Rate>

Figure 3:
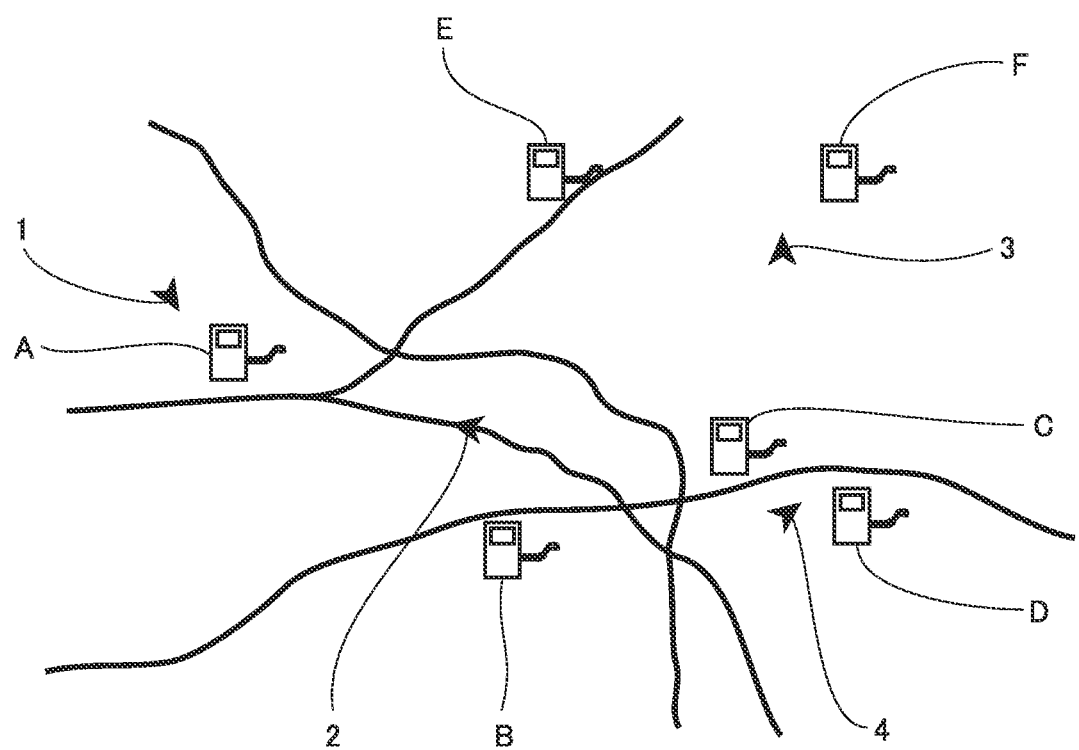
FIG. 3 is a diagram illustrating an example situation where the charging information providing system is used.

FIG. 3 is a diagram illustrating an example situation where charging information providing system 9 is used. In Embodiment 1, suppose that chargers A to F are arranged at six locations and four vehicles 1 to 4 are traveling, as shown in FIG. 3. In the charging information providing system, in order to assist the user in selecting a charger, indices indicating potential demands (potential congestion levels) for conducting plug-in charging at chargers A to F are provided as charging information to each of vehicles 1 to 4. Note that, in the following, processes executed by circuitry 500 will be described as processes executed by "server 5," for clarity of description.

Server 5 collects from each of chargers A to F, information (use history information) indicating a use history of the charger. Use history information of all the chargers A to F are equivalent and thus use history information for charger A will be representatively described below.

FIG. 4 is a diagram illustrating example use history information of charger A. As shown in FIG. 4, use history information includes information on use times [unit: minute] of charger A which are measured at different time periods. The time periods are each determined to be, for example, a four-hour duration obtained by equally dividing one day (24 hours) by 6. Moreover, day-of-the-week when the use time is measured is distinguished, and the day is also distinguished as to whether it is a weekday, a holiday, or a weekend.

From the example shown in FIG. 4, for example, it can be seen that the first day of a certain month is Wednesday and the use time of charger A in a time period from midnight to early morning (midnight to 4 AM) of that day is 20 minutes. It can also be seen that Friday, the third day of the month, is a holiday and the use time of charger A in a time period from noon to evening (noon to 4 PM) of that day is 200 minutes.

Such information about the use times is continuously obtained from when charger A is installed up to now and stored in use history database 513. The use times are then averaged for each time period and each attribute (weekday, weekend, or holiday) of the day of measurement, thereby calculating the "usage rate" of charger A, as described below.

FIG. 5 is a diagram for illustrating the usage rates of charger A. Referring to FIG. 5, for example, the use times shown in FIG. 4 are classified by weekday, weekend, and holiday, and are further classified for each time period. Then, results of measurements of the use times [unit: minute] are averaged for each classification, thereby calculating the usage rate [unit: %] of charger A for each time period. In the example shown in FIG. 5, for example, the usage rates of charger A are calculated such that the usage rate of charger A in a time period from midnight to early morning (midnight to 4 AM) on weekdays is very low as 5%, whereas the usage rate of charger A in a time period from noon to evening (noon to 4 PM) on weekends or holidays is sufficiently high as 68%.

The results of calculation of the usage rates of charger A are also stored in use history database 513. Although not shown, the usage rates for each time period are calculated and stored in use history database 513 similarly for the rest of the chargers B to F.

While FIGS. 4 and 5 have been described with reference to the use of time periods and attributes of the day of measurement to calculate the usage rates, it should be note that the usage rates may be calculated by classifying use times by other parameters that can have impact on the usage rates. For example, weather, such as sunny, cloudy, or rainy, may be obtained from a weather information database (not shown), and a usage rate of each charger may be calculated for each weather. Moreover, a usage rate of each charger may be calculated by outside temperature. Alternatively, any parameters among the time period, the attribute of the day of measurement, the weather, and the outside temperature, may be combined.

<Calculating Effective Number of Vehicles>

In addition to such use histories of chargers A to F, the present embodiment considers the travelling situations of vehicles 1 to 4. Specifically, initially, for each of vehicles 1 to 4, a total number of chargers within an accessible range (described as "access range") of a vehicle is calculated, and a parameter for the vehicle, representing a likelihood that the vehicle arrives at a charger, is calculated so that the greater the total number of chargers within the accessible range is, the less the parameter is. The parameter will be hereinafter referred to as a "reduced number n."

Figure 6:
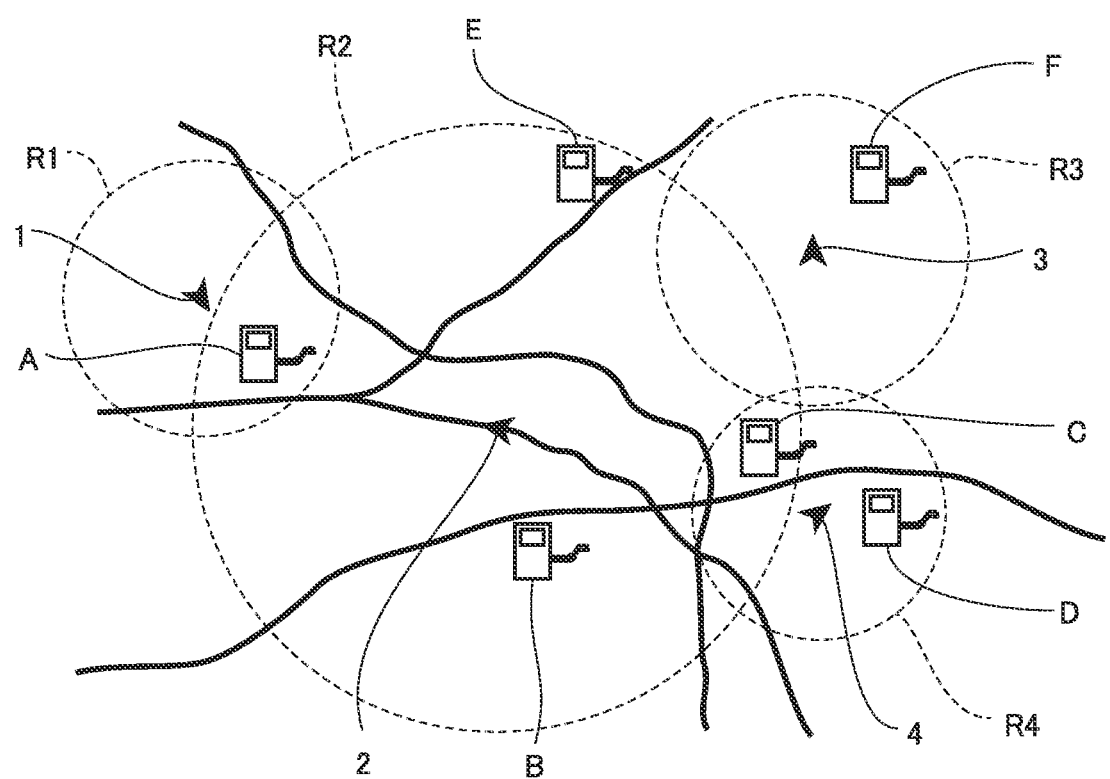
FIG. 6 is a diagram for illustrating an effective number of vehicles for each charger.

FIG. 6 is a diagram for illustrating reduced numbers n of vehicles 1 to 4. In FIG. 6, the access range of vehicle 1 is represented by a circular region R1. Circular region R1 has the current location of vehicle 1 as the center and a remaining travel distance of vehicle 1 as the radius.

More specifically, server 5 periodically collects, from vehicle 1, information indicating the current location of vehicle 1, and information indicating an amount of power stored in battery 110 (the remaining amount of power) of vehicle 1. Based on these information, server 5 calculates an average energy consumption (an average amount of power consumed per unit distance) of vehicle 1. Therefore, server 5 can calculate a remaining travel distance for the amount of power stored in battery 110. In this manner, server 5 obtains circular region R1 for vehicle 1.

In the example shown in FIG. 6, charger A is located within circular region R1, whereas the rest of chargers B to F are located outside the circular region R1. In this case, vehicle 1 is only be able to arrive at charger A, and unable to arrive at chargers B to F. Considering with respect to charger A, this means that the plug-in charging of vehicle 1 is surely going to be conducted at charger A, although when the plug-in charging is to occur is unknown. In the present embodiment, reduced number n of vehicle 1 is defined by an inverse (reciprocal) of the number of chargers accessible by vehicle 1, and calculated as n=1/1=1.00.

Next, regarding vehicle 2, currently, a sufficient amount of power is remained in battery 110 of vehicle 2. Therefore, the access range (circular region R2) of vehicle 2 is wider than the access ranges of the other vehicles 1, 3, and 4. Chargers A, B, C, and E are provided at four locations within circular region R2. In this case, plug-in charging of vehicle 2 may be conducted by any of chargers A, B, C, and E. Therefore, reduced number n of vehicle 2 is calculated as n=¼=0.25.

Similarly, regarding vehicle 3, only charger F is provided within a circular region R3. In this case, reduced number n of vehicle 3 is calculated as n=1/1=1.00. Regarding vehicle 4, two chargers C and D are provided within a circular region R4. In this case, reduced number n of vehicle 4 is calculated as n=½=0.50.

Next, for each of chargers A, B, C, and E, an "effective number N" of vehicles which can conduct plug-in charging at that charger is calculated from the reduced numbers n of vehicles 1 to 4.

In the example shown in FIG. 6, two vehicles, vehicles 1 and 2, can access charger A. Reduced number n of vehicle 1 is n=1.00, and reduced number n of vehicle 2 is n=0.25. Therefore, effective number N for charger A is calculated as N=1+0.25=1.25, which is a sum of reduced numbers n of vehicles 1 and 2.

Similarly, vehicle 2 is the only vehicle that can access charger B. Therefore, effective number N for charger B is N=0.25. Vehicles 2 and 4 can access charger C. Therefore, effective number N for charger C is calculated as N=0.25+0.50=0.75. The method of calculation of effective numbers N for the rest of chargers D to F is the same as well.

Then, an index indicating a potential demands for plug-in charging at each of chargers A to F is calculated by a function comprising, as parameters, effective number N for a charger and usage rate U of the charger in the current time period. The index is referred to as a "congestion index," and represented as I. The above function for calculating congestion index I is referred to as an "evaluation function," and represented as f. Congestion index I is represented as shown in Equation (1) below by an evaluation function f comprising effective number N and usage rate U as parameters.

$$I=f(N,U) \qquad (1)$$

Various functions can be employed as a specific evaluation function f. In Embodiment 1, as a simplest example, evaluation function f is defined by a product of effective number N and usage rate U (see Equation (2) below).

$$I=N \times U \qquad (2)$$

FIG. 7 is a diagram for illustrating a method of calculation of congestion indices I of chargers A to F. Referring to FIG. 7, effective number N for charger A is N=1.25, as mentioned above. On the other hand, if the current time is within a time period from 8 AM to noon on a weekday, usage rate U of charger A is U=35%, according to the list of usage rates shown in FIG. 5. Thus, the current congestion index I of charger A is calculated as 1.25×35%≈0.44.

The effective number of vehicle 2 is N=0.25. Suppose that usage rate U of charger B in a time period from 8 AM to noon on weekdays is U=40% (not shown). In this case, congestion index I of charger B is calculated as 0.25× 40%=0.10. Since the method of calculation of congestion indices I of the other chargers C to F is the same as that for charger B, detailed description thereof will not be repeated.

The greater the effective number N for charger A, the more the number of vehicles that can conduct plug-in charging at charger A. However, presence of a large number of vehicles that can conduct plug-in charging at charger A does not necessarily means that the plug-in charging is actually conducted at charger A. Depending on a time period, a demand for plug-in charging can be low even though the number of vehicles is high, and, conversely, a demand for plug-in charging can be high even though the number of vehicles is low. Therefore, past use history (usage rate U) of charger A in the current time period is further considered. Usage rate U being high means that the demand for charger A in the same time period being high in the past. Thus, the demand for charger A is still likely to be high.

As such, according to the present embodiment, both the effective number N and usage rate U are considered to calculate congestion index I of charger A. While it is uncertain whether the charger is actually to be used is, the higher the congestion index I the charger has, the higher the potential demand for plug-in charging at that charger is, and that charger is highly likely to be congested. Thus, when there are multiple chargers within the access range of the user's own vehicle, the user is highly likely to be able to avoid congestion or shorten the wait time by selecting a charger having congestion index I as low as possible. As such, server 5 calculates congestion index I for each of chargers A to F and provides results of the calculation to the user, thereby assisting the user in selecting a charger.

<Selection Assist Process Flow>

In the following flowchart, a configuration of server 5 assisting the user of vehicle 2 in selecting a charger will be described based on the example shown in FIG. 6.

Figure 8:
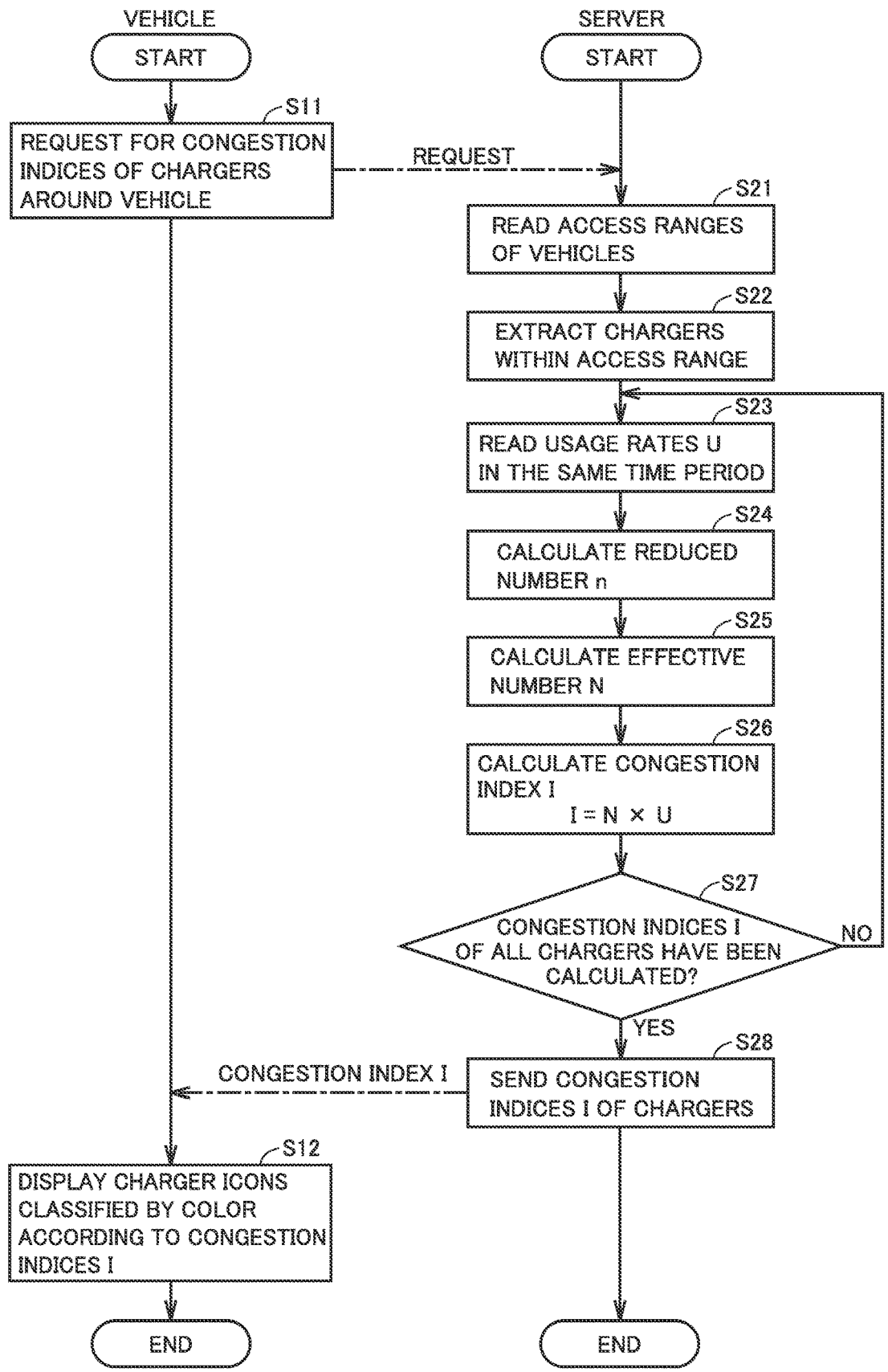
FIG. 8 is a flowchart showing a charger-selection assist process according to Embodiment 1.

FIG. 8 is a flowchart showing a charger-selection assist process according to Embodiment 1. Flowcharts in FIG. 8 and FIG. 10 described below show a series of processes performed by vehicle 2 (ECU 100 of vehicle 2) on the left side of the figure, and a series of processes performed by server 5 (circuitry 500 included in server 5) on the right side of the figure. Each step (hereinafter, abbreviated as "S") included in these flowcharts is basically implemented by software processing by ECU 100 or circuitry 500, but may be implemented by dedicated hardware (electric circuits) fabricated within ECU 100 or circuitry 500.

Although not shown, vehicle 2 periodically sends to server 5 the GPS information indicating the current location of vehicle 2 and information indicating a remaining travel distance of vehicle 2. The same is true for the other vehicles 1, 3, and 4. Based on these information, server 5 calculates access ranges for vehicles 1 to 4, and stores results of the calculation into access-range database 512. This keeps data stored in access-range database 512 always up-to-date.

Referring to FIG. 8, at S11, vehicle 1, wishing for plug-in charging, requests server 5 to provide vehicle 1 with charging information (congestion indices I of chargers around vehicle 1).

At S21, server 5 refers to access-range database 512 to read the access ranges of vehicles 1 to 4.

At S22, server 5 refers to the location information of chargers stored in location information database 511 to extract chargers that are within the access range of vehicle 2 read at S21. In the example shown in FIG. 6, chargers A, B, C, and E located at four locations within the access range (circular region R2) of vehicle 2 are extracted.

At S23, server 5 reads, from use history database 513, usage rates U of the chargers within the access range of vehicle 2. In the example shown in FIG. 6, for example, if the current time is within a predetermined time period of a weekday, past usage rates U of chargers A, B, C, and E at four locations in the same time period of weekdays are read from use history database 513.

At S24, server 5 calculates reduced number n for each vehicle that can be involved with the chargers extracted at S22. As mentioned above, reduced number n for a certain vehicle is calculated by an inverse of the number of chargers within the access range of that vehicle. In the example shown in FIG. 6, among chargers A, B, C, and E located within the access range of vehicle 2, initially, reduced numbers n for vehicles that can access charger A is calculated. Specifically, for vehicles 1 and 2 which can access charger A, reduced number n of vehicle 1 is n=1, and reduced number n of vehicle 2 is n=0.25.

At S25, server 5 calculates effective number N of vehicles, for each charger, which can access the charger by summing reduced numbers n for the charger. In the example shown in FIG. 6, effective number N of vehicles which can access charger A is calculated as N=1+0.25=1.25 (see FIG. 7).

At S26, server 5 multiplies effective number N, calculated at S25, by usage rate U (a value for each time period by weekdays, weekends, and holidays) read at S23, thereby calculating congestion index I for each charger. By way of example, effective number N of vehicles that can access charger A, which is N=1.25, is multiplied by usage rate U of charger A, which is U=35%, thereby calculating congestion index I for charger A as I=N×U=0.44 (see FIG. 7).

At S27, server 5 determines whether congestion indices I of chargers extracted at S31 all have been calculated. If congestion indices I of all chargers are not calculated (NO at S27), the process returns to S23 and congestion index I of the subsequent charger is calculated. With this, congestion indices I for the rest of chargers B, C, E are also calculated. As the calculation of congestion indices I of all chargers A, B, C, and E is completed (YES at S27), server 5 sends congestion indices I of chargers A, B, C, and E to vehicle 2 (S28).

At S12, as ECU 100 included in vehicle 2 receives congestion indices I of chargers A, B, C, and E from server 5, ECU 100 displays them on display 132 of navigation device 130. While numeric values indicating congestion indices I may be displayed, it is desirable to employ a display method as follows.

FIGS. 9A and 9B are diagrams for illustrating a method of display of congestion indices I on display 132 included in navigation device 130. In the present embodiment, a map display (e.g., see FIG. 3) on display 132 includes an icon indicating the current location of vehicle 2 and icons indicating locations of chargers. The charger icon has a color that is determined in a stepwise manner according to congestion index I of that charger. More specifically, congestion indices I are divided into multiple classifications, and the charger icon is set to a color according to the classification.

By way of example, as shown in FIG. 9A, congestion indices I of chargers are classified into five stages by predetermined values I1 to I4. Then, the icon is displayed in red if congestion index I is I4 or greater, the icon is displayed in orange if congestion index I is I3 or greater and less than I4, the icon is displayed in yellow if congestion index I is I2 or greater and less than I3, the icon is displayed in green if congestion index I is I1 or greater and less than I2, and the icon is displayed in blue if congestion index I is (0 or greater and) less than I1. Visualizing congestion index I by a charger icon as such allows the user to more readily select a charger that has a low congestion index I (a charger having a low congestion level).

While FIG. 9A has been described with reference to classifying congestion indices I (absolute values) by icon color, the method of classification by color is not particularly limited. For example, congestion index I may be classified by color according to a relative value of congestion index I.

Describing more specifically, the flowchart in FIG. 8 is described with reference to the case where chargers whose congestion index I is to be calculated are chargers A, B, C, and E at four locations within the access range of vehicle 2. However, in practice, server 5 calculates congestion indices I of a large number of chargers installed in a wider area, in response to various requests from vehicles. Therefore, server 5 may classify congestion index I of each of chargers A, B, C, and E by color, according to a relative value of congestion indices I of all the chargers installed in an area (e.g., in the same city) in which vehicle 2 is traveling.

A specific example will be described. Server 5 determines a maximum value of congestion indices I of chargers that are installed in an area (in the same city) in which vehicle 2 is traveling. Server 5 then calculates a relative value for congestion index I of charger A from the percentage of congestion index I of charger A to the maximum value (=congestion index I of charger A/the maximum value of congestion index I). The relative value (relative congestion index P) is represented by a numeric value within a range from 0% to 100%.

Then, as shown in FIG. 9B for example, if relative congestion index P is 90% or greater (and 100% or less), the icon for charger A can be displayed in red, if relative congestion index P is 70% or greater and less than 90%, the icon can be displayed in orange, if relative congestion index P is 50% or greater and less than 70%, the icon can be displayed in yellow, if relative congestion index P is 30% or greater and less than 50%, the icon can be displayed in green, and if relative congestion index P is (0% or greater and) less than 30%, the icon can be displayed in blue.

Referring to icon colors shown on display 132 of navigation device 130, the user of vehicle 2 operates the touch panel on display 132 to select any charger (e.g., a charger having a lowest congestion index I or a lowest relative congestion index P). Doing so causes navigation device 130 to display on display 132 a travel route (recommended route) from the current location of vehicle 1 to the selected charger, and starts a route guide to the selected charger. Note that congestion indices I or relative congestion index P may be informed to the user by sound, instead of displaying them on navigation device 130.

As described above, in Embodiment 1, effective number N is calculated, which indicates an effective number of vehicles which are located within a range from which they can access a certain charger, and which can conduct plug-in charging at that charger. Congestion index I (=N×U), indicating a magnitude of a potential demand for plug-in charging at that charger, is then calculated based on effective number N for the charger and past use history of that charger. Use of congestion index I allows the user to suitably select a charger that is highly unlikely congested. As such, according to Embodiment 1, appropriate information for the user to select a desirable charger can be provided.

While the present embodiment has been described with reference to the use of both the effective number N and usage rate U to calculate congestion index I, usage rate U is not essential. Since a large effective number N of vehicles that can access a certain charger means that there are a large number of vehicles that can conduct plug-in charging at that charger. Thus, this charger is more likely congested. In other words, likelihood that the charger would be congested can be estimated even from effective number N only. Thus, simply, congestion index I may be equal to effective number N, without considering the past use history of the certain charger.

Note that chargers extracted by server 5 at S21 and S22 are not limited to those within the circular region having a vehicle at the center, as shown in FIG. 6. For example, in addition to the information indicating the remaining travel distance of a vehicle, server 5 may obtain, from the vehicle, information indicating a planned travel route for the vehicle. In this case, chargers, which are located along the planned travel route (or around the planned travel route) from the current location of the vehicle, can be extracted.

Moreover, while Embodiment 1 has been described with reference to vehicles 1 to 4 all being electric vehicles, vehicles 1 to 4 may be plug-in hybrid vehicles. Since a plug-in hybrid vehicle can be fueled even when a remaining travel distance is decreasing, it is contemplated that a demand by plug-in hybrid vehicles for plug-in charging is small, as compared to electric vehicles. Thus, server 5 can obtain whether the vehicle is an electric vehicle or a plug-in hybrid vehicle, and calculate reduced number n such that the reduced number n when the vehicle is a plug-in hybrid vehicle is smaller than when the vehicle is an electric vehicle.

Embodiment 2

Embodiment 1 has been described with reference to defining congestion index I by a product of effective number N and usage rate U of a charger (see Equation (2) above). However, this is merely one example of evaluation function f for calculating congestion index I of charger A, and the form of evaluation function f is not particularly limited. In Embodiment 2, an example will be described in which other evaluation function f is used. Note that the configuration of charging information providing system 9 according to Embodiment 2 is the same as the configuration according to Embodiment 1 (see FIGS. 1 and 2).

In Embodiment 2, congestion index I is defined by adding effective number N and usage rate U by respective predetermined ratios, as indicated in Equation (3) below.

$$I = \alpha N + \beta U \qquad (3)$$

Coefficient $\alpha$ for effective number N and coefficient $\beta$ for usage rate U according to Equation (3) are determined by an optimization algorithm such that they best fit the data (a large number of combinations of congestion index I, effective number N, and usage rate U, what is called big data) actually obtained during plug-in charging of many vehicles. As described below, coefficients $\alpha$ and $\beta$ can be determined by a machine learning using a gradient method.

Consider a case where a certain vehicle (here, described as "vehicle V") conducts plug-in charging at a certain charger (described as "charger CHG"). In this case, server 5 calculates effective number N for charger CHG and usage rate U of charger CHG is read from use history database 513, as described above. Moreover, when vehicle V arrives at charger CHG, if charger CHG is in use by another vehicle, congestion index I=1, and if charger CHG is available, congestion index I=0. The combination of there values (N, U, I) are substituted into Equation (3), thereby yielding an equation having coefficients $\alpha$ and $\beta$ as unknowns.

Similarly for plug-in charging conducted for a vehicle other than vehicle V, values of effective number N, usage rate U, and congestion index I are substituted into Equation (3), thereby yielding another equation having coefficients $\alpha$ and $\beta$ as unknowns. Doing so yields the same number of equations as the number of times the plug-in charging has been conducted.

Combinations of coefficients $\alpha$ and $\beta$ are calculated by a gradient method so as to best fit a large number of equations obtained as such. More specifically, a combination of coefficients $\alpha$ and $\beta$ is calculated by the machine learning so that mean-squared error $J=(\alpha N+(\beta U-I)^2$ for Equation (3) is minimum. Use of the calculated coefficients $\alpha$ and $\beta$ allows congestion index I for new plug-in charging by a vehicle to be calculated from effective number N and usage rate U.

Figure 10:
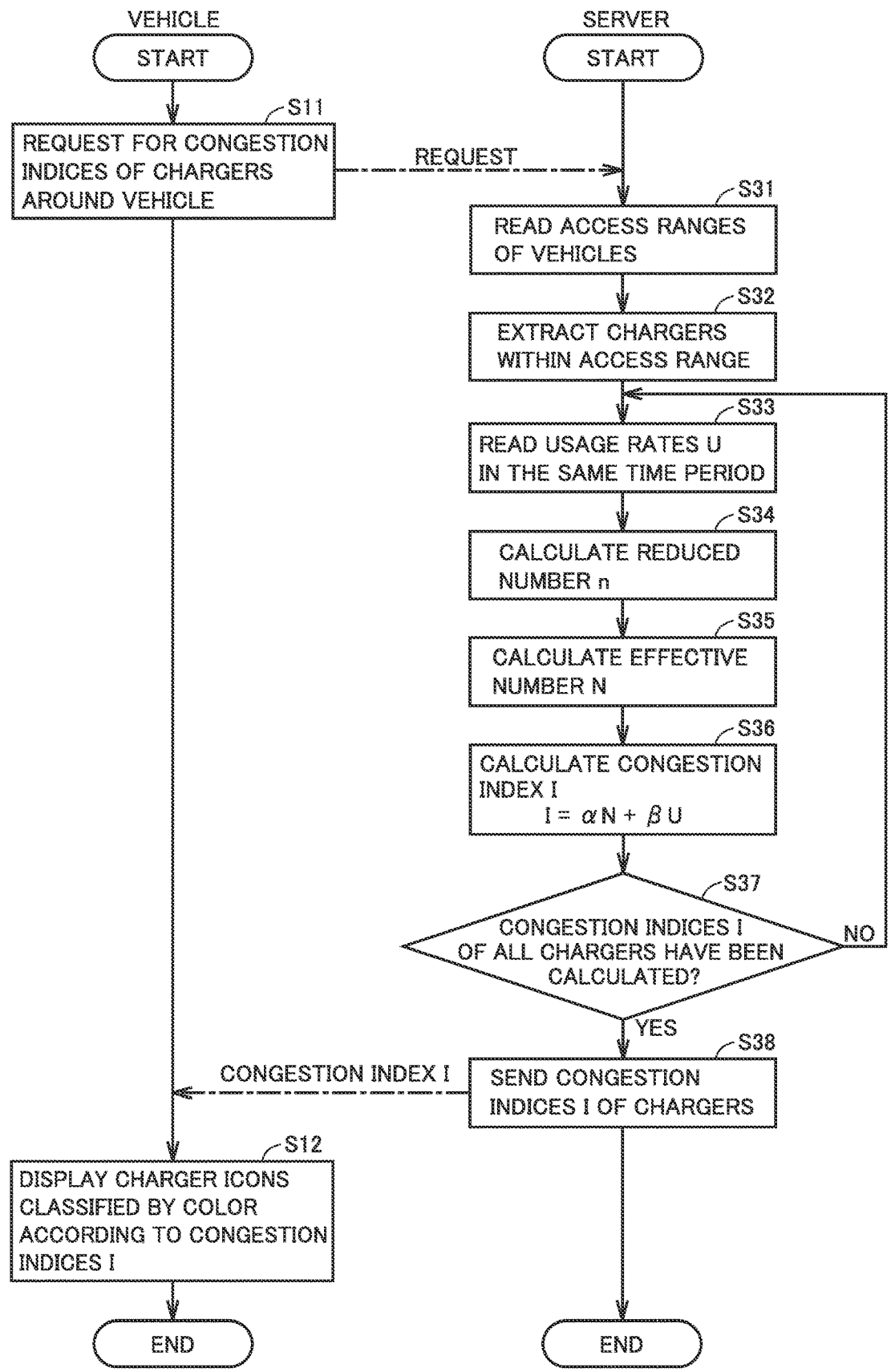
FIG. 10 is a flowchart showing a charger-selection assist process according to Embodiment 2.

FIG. 10 is a flowchart showing a charger-selection assist process according to Embodiment 2. The machine learning mentioned above has been done prior to the execution of the flowchart, and coefficients $\alpha$ and $\beta$ have been calculated.

Referring to FIG. 10, the flowchart is the same as the flowchart (see FIG. 8) according to Embodiment 1, except that this flowchart includes a process step S36, instead of the process step S26. At S36, server 5 substitutes effective number N calculated at S35 and usage rate U (a value for each time period by weekdays, weekends, and holidays) read at S33 into the above Equation (3) to calculate congestion index I for each charger. The process steps other than S36 are the same as corresponding process steps according to Embodiment 1, and thus detailed description thereof will not be repeated.

As described above, in Embodiment 2, congestion index I is calculated by summing effective number N weighed by coefficient $\alpha$ and usage rate U weighed by coefficient $\beta$. When congestion index I is defined as such, the magnitude of a potential demand for plug-in charging can be appropriately represented by congestion index I, as long as coefficients α and β are sufficiently optimized by the machine learning on numerous data. Thus, as with Embodiment 1, Embodiment 2 can also provide appropriate information for a user to determine a desirable charger to select, thereby allowing the user to readily select a charger that is highly unlikely congested.

Variation 1 of Embodiment 2

In Embodiments 1 and 2, description is given that the current location of a vehicle and information about a remaining travel distance of the vehicle are collected by server 5 to calculate effective number N. However, server 5 may not always collect from all vehicles the current locations and information about remaining travel distances of the vehicles, and there may be vehicles that do not send the above information to server 5 (i.e., vehicles unregistered to charging information providing system 9). Chargers may be congested for plug-in charging by such "unregistered vehicles." Moreover, some chargers may not be recognized by many drivers because, for example, periods have not elapsed much time since the chargers are newly installed. In Embodiment 2, the impacts of vehicles unregistered to charging information providing system 9 and newly installed chargers are considered in calculating congestion index I.

Figure 11:
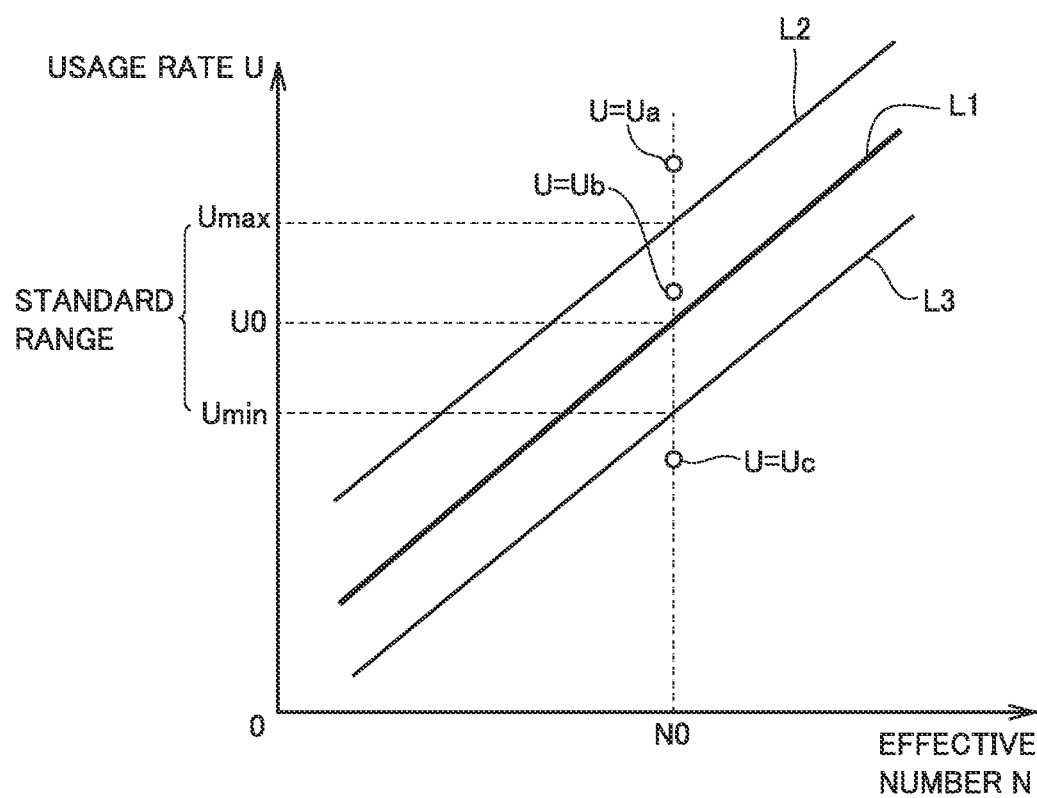
FIG. 11 is a diagram for quantitatively illustrating the relationship between an effective number of vehicles for a certain charger and a usage rate of that charger.

FIG. 11 is a diagram for quantitatively illustrating the relationship between effective number N and usage rate U of a certain charger. In FIG. 11, the horizontal axis represents effective number N for the charger, and the vertical axis represents usage rate U of the charger.

A current effective number N for a charger and usage rate U which is a past use history of the charger correspond. Describing more specifically, in general, the greater the effective number N for a certain charger, the more the number of vehicles that are going to conduct plug-in charging at that charger in the near future. It is contemplated that this trend applies to the past as well. Thus, the greater the effective number N for a charger, the higher the usage rate U of that charger becomes. As one such example, FIG. 11 shows an example in which usage rate U linearly increases with an increase of effective number N (see straight line L1).

Typically, as effective number N is determined, usage rate U is within a certain range which encompasses straight line L1. This range will be referred to as a "standard range" for usage rate U. In FIG. 11, a straight line indicating the maximum value of the standard range is represented as L2, and a straight line indicating the minimum value of the standard range is represented as L3.

In the following, an example will be described in which effective number N for a certain charger (described as charger X) is N0 in a certain time period (described as a time period T). As shown in FIG. 11, the standard range for usage rate U when effective number N=N0 is between a minimum value Umin and a maximum value Umax.

Suppose that usage rate U of charger X in time period T stored in use history database 513 is Ub within the standard range. In this case, as with Embodiment 2, congestion index I is calculated according to Equation (3) above.

Next, suppose that usage rate U of charger X in time period T is Ua. Ua is higher than maximum value Umax of the standard range. In other words, usage rate U of charger X in time period T is significantly higher than a usage rate typically expected from effective number N. In such a case, in time period T in the past use history of charger X, there may have been many unregistered vehicles around charger X or more vehicles may have been around charger X because of some event or the like, and charger X may have been used many times by these vehicles.

In view of the foregoing, if the usage rate of a charger in a certain time period is higher than the maximum value of the standard range calculated from the effective number for the charger, congestion index I is calculated according to a mathematical formula different from that when the usage rate of the charger is within the standard range, to consider the presence of unregistered vehicles. Specifically, if the usage rate of the charger is within the standard range, coefficients α and β are used to calculate congestion index I (see Equation (3) above), whereas if the usage rate of the charger is higher than the maximum value of the standard range, other coefficients γ and δ are used, as indicated by Equation (4) below.

$$I=\gamma N+\delta U \quad (4)$$

As with coefficients α and β, coefficients γ and δ in Equation (4) can also be determined by performing the machine learning, using a gradient method, on numerous data obtained when the usage rate of the charger is higher than the maximum value of the standard range.

Comparing Equation (4) with Equation (3), the magnitude of coefficient δ to coefficient γ (=δ/γ) is greater than the magnitude of coefficient β to coefficient α (=β/α). This means that the second term (δU) is regarded more important than the first term (γN) in Equation (4) if the usage rate of the charger is higher than the maximum value of the standard range, stated differently, usage rate U is weighed greater than weighing effective number N.

Conversely, a case will be described where usage rate U of charger X in time period T is Uc which is less than minimum value Umin of the standard range. In this case, usage rate U of charger X in time period T is significantly lower than a usage rate typically expected from effective number N. This indicates that usage rate U may be too low in past use history of charger X because, for example, charger X has been installed relatively recently and the presence of charger X is not well recognized immediately after the installation. In such a case also, congestion index I is calculated according to a mathematical formula using still other coefficients ε and ζ (see Equation (5) below).

$$I=\varepsilon N+\zeta U \quad (5)$$

Here, the magnitude of coefficient ε to coefficient ζ (=δ/ζ) is greater than the magnitude of coefficient α to coefficient β (=α/β). This means the first term (εN) is regarded more important than the second term (ζU) in Equation (5) if the usage rate of the charger is less than the minimum value of the standard range, stated differently, effective number N is weighed greater than weighing usage rate U.

Note that FIG. 11 has been described with reference to usage rate U linearly increasing with an increase of effective number N. However, the function representing an incremental manner of usage rate U is not particularly limited, insofar as usage rate U monotonically increases with an increase of effective number N.

Figure 12:
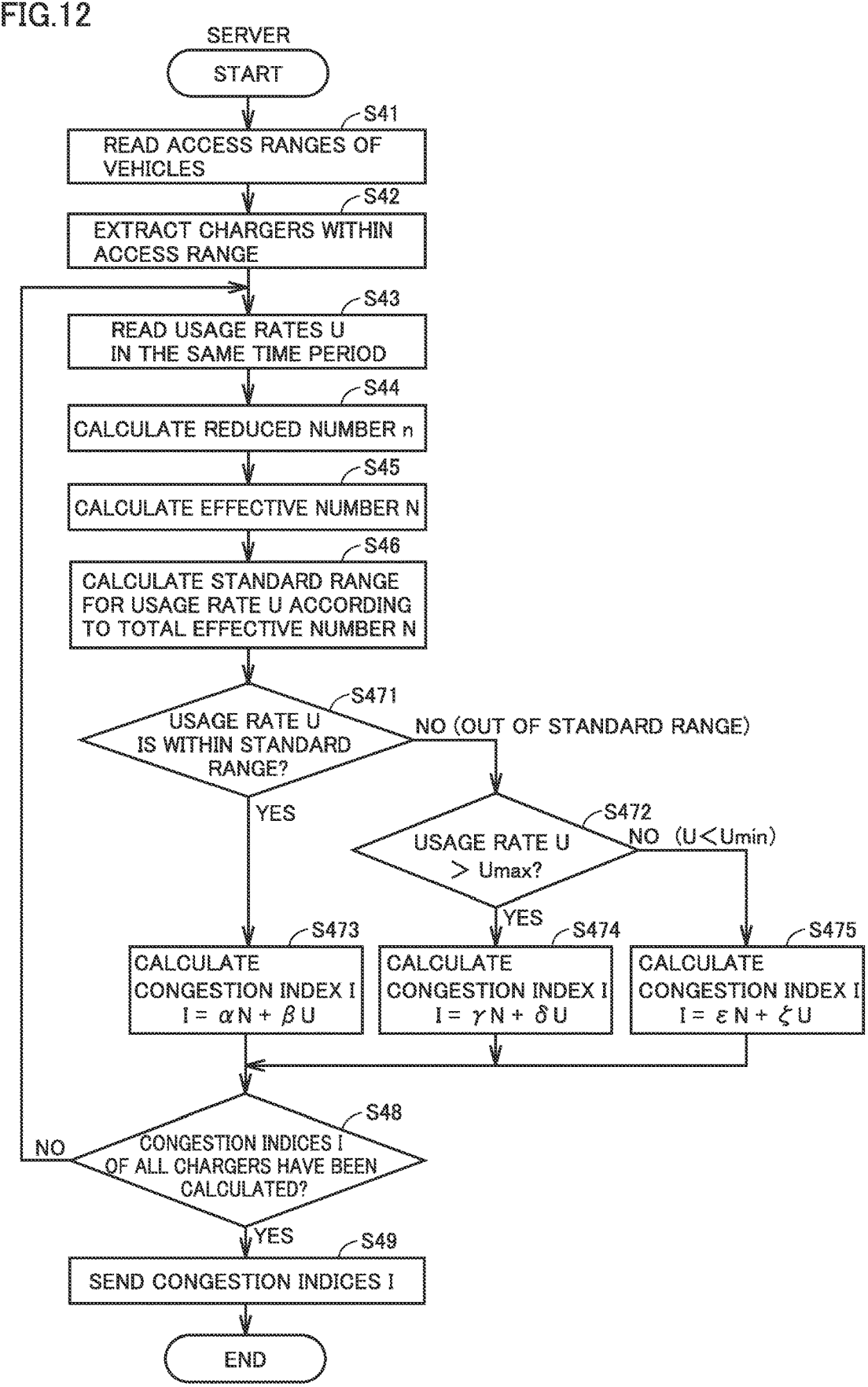
FIG. 12 is a flowchart showing a charger-selection assist process according to Variation 1 of Embodiment 2.

FIG. 12 is a flowchart showing a charger-selection assist process according to Variation 1 of Embodiment 2. Referring to FIG. 12, the flowchart is the same as the flowchart (see FIG. 10) according to Embodiment 2, except that this flowchart includes process steps S46 to S475.

Note that process steps S41 to S45 are the same as the process steps S31 to S35, respectively, according to Embodiment 2, and thus the description thereof will not be repeated.

Moreover, in FIG. 12 and FIG. 13 described below, while processes (see the left side of the flowchart in FIG. 8 or 10) performed by vehicle 2 are not described due to space constraints, the processes by vehicle 2 are common to those illustrated in FIG. 8 or 10.

At S46, server 5 calculates a standard range for usage rate U according to effective number N calculated at S45. More specifically, the maximum value and minimum value of the standard range as shown in FIG. 11 are predetermined for each effective number N, and stored as a map (may be as a function or a relation, for example) in a memory (not shown) of server 5. Server 5 refers to the map to calculate the maximum value and minimum value of the standard range from effective number N.

At S471, server 5 determines whether usage rate U read at S43 is within the standard range calculated at S46. If usage rate U is within the standard range (YES at S471), server 5 calculates congestion index I for the charger according to the above Equation (3) (S473). Specifically, server 5 reads coefficients α and β from the memory and substitutes coefficients α and β, effective number N calculated at S45, and usage rate U read at S43 into the above Equation (3) to calculate congestion index I of the charger.

In contrast, if usage rate U is out of the standard range (NO at S471), server 5 determines whether usage rate U is greater than maximum value Umax of the standard range (S472). If usage rate U is greater than maximum value Umax of the standard range (YES at S472), server 5 passes the process to S474, and calculates congestion index I of the charger according to Equation (4) above. Specifically, server 5 substitutes coefficients γ and δ read from the memory, effective number N calculated at S45, and usage rate U read at S43 into Equation (4) to calculate congestion index I of the charger.

On the other hand, if usage rate U is less than minimum value Umin of the standard range (NO at S472), server 5 passes the process to S475, and calculates congestion index I of the charger according to Equation (5) above. Specifically, server 5 substitutes coefficients ε and ζ read from the memory, effective number N calculated at S45, and usage rate U read at S43 into Equation (5) to calculate congestion index I of the charger.

As any of the process steps S473, S474, and S475 ends, server 5 determines whether congestions I of all the chargers extracted at S42 have been calculated. If congestions I of all the chargers have not been calculated (NO at S48), the process returns to S43 and congestion index I for the subsequent charger is calculated. As the calculation of congestions I of all the chargers have completed (YES at S48), server 5 sends congestion index I of each charger to vehicle 2 (S49).

As described above, as with Embodiment 2, in Variation 1 of Embodiment 2, congestion index I is calculated by summing effective number N weighed by a coefficient and usage rate U weighed by a coefficient. Here, in Variation 1, different coefficients are used depending on whether usage rate U of the charger is within the standard range, whether usage rate U is higher than maximum value Umax of the standard range, or whether usage rate U is lower than minimum value Umin of the standard range. This allows the impact of the presence of vehicles unregistered to charging information providing system 9 and the impact of newly installed chargers to be more accurately reflected onto congestion index I. Thus, according to Variation 1 of Embodiment 2, the accuracy of the charging information used by the user to select a charger is further improved, as compared to Embodiment 2.

Note that FIG. 12 has been described with reference to three conditions according to a magnitude relation between usage rate U and the standard range of the charger. However, two conditions may be employed, which are whether usage rate U of the charger is within the standard range and whether usage rate U of the charger is higher than maximum value Umax of the standard range. Alternatively, other two conditions may be employed, which are whether usage rate U of the charger is within the standard range and whether usage rate U of the charger is lower than minimum value Umin of the standard range.

Variation 2 of Embodiment 2

As mentioned above, coefficients α and β are calculated by applying to numerous data (big data) an optimization algorithm, such as the machine learning using a gradient method. In general, in order to ensure the accuracy of the machine learning, an adequate amount of data needs to be prepared. Thus, if the amount of data about use history (usage rate U) of the charger is not adequate, a decreased accuracy in calculation of coefficients α and β may result.

Even if there are one or multiple vehicles within the access range of a certain charger, whether plug-in charging at that charger is to be actually conducted is stochastic. If a sufficient number of vehicles (effective number N) are within the access range of the charger, a potential demand for plug-in charging at that charger is appropriately reflected on congestion index I. However, if effective number N for the charger is excessively low, effective number N significantly varies. Thus, even though congestion index I is calculated, and it may not be unreliable. As such, in Variation 2 of Embodiment 2, cases are considered where the amount of data of usage rate U of the charger is insufficient or where effective number N for the charger is insufficient.

FIG. 13 is a flowchart showing a charger-selection assist process according to Variation 2 of Embodiment 2. Referring to FIG. 13, the flowchart is the same as the flowchart (see FIG. 10) according to Embodiment 2, except that this flowchart includes process steps S561 to S566. The process steps S51 to S55 are the same as the process steps S31 to S35, respectively, according to Embodiment 2.

At S561, server 5 determines whether an amount of data of usage rate U of a target charger is sufficient and effective number N is a predetermined reference number Nc or greater. By way of example, the amount of data of usage rate U is determined to be sufficient if charger use history data as shown in FIG. 4 is stored in use history database 513 for a predetermined period (e.g., one year) or longer. On the other hand, the amount of data of usage rate U is determined to be insufficient if the charger use history data is stored less than a year.

If the amount of data of usage rate U is sufficient and effective number N is reference number Nc or greater (YES at S561), server 5 calculates congestion index I of the charger according to the Equation (3) above (S564). This process is the same as the process already described in detail. In contrast, if the amount of data of usage rate U is not sufficient or if effective number N is less than reference number Nc (NO at S561), the process is passed to S562.

If the amount of data of usage rate U is sufficient and effective number N is less than reference number Nc (YES at S562), server 5 calculates congestion index I of the charger according to Equation (6) below (S565).

$$I = \alpha' N + \beta U \quad (6)$$

Coefficient α' for effective number N in Equation (6) is smaller than coefficient α in Equation (3) by a predetermined value (α'<α). As such, Equation (6) is Equation (3) that is corrected so that effective number N is weighed less than in Equation (3).

If the amount of data of usage rate U is not sufficient and effective number N is reference number Nc or greater (YES at S563), server 5 calculates congestion index I of the charger according to Equation (7) below (S566).

$$I=\alpha N+\beta' U \qquad (7)$$

Coefficient β' for usage rate U in Equation (7) is smaller than coefficient β in Equation (3) by a predetermined value (β'<β). As such, at S566, congestion index I of the charger is calculated according to Equation (7) which is Equation (3) corrected so that usage rate U is weighed less than in Equation (3).

If the amount of data of usage rate U of a certain charger is not sufficient and effective number N is less than reference number Nc (NO at S563), server 5 does not calculate congestion index I of that charger and sends a notification as such to vehicle 2. Then, an icon for the charger whose congestion index I is not calculated is displayed on display 132 of navigation device 130 of vehicle 2, without a color. This can prevent the user from selecting a charger whose congestion index I is not calculated. Note that the processing at and after S57 are the same as the processing at and after S37, and thus the description thereof will not be repeated.

As described above, in Variation 2 of Embodiment 2, if the amount of data of usage rate U of a charger is insufficient, a low weight is applied on usage rate U, as compared to when the amount of data of usage rate U of the charger is sufficient and effective number N is sufficient (when the sample size is large). If effective number N for the charger is insufficient, a low weight is applied on effective number N, as compared to when the sample size is large. This increases the impact of a more reliable one of parameters among usage rate U of the charger and effective number N, thereby improving the accuracy of congestion index I. Thus, according to Variation 2 of Embodiment 2, the accuracy of the charging information used by the user to select a charger can be further improved.

However, it is not essential to consider both the amount of data of usage rate U of the charger and effective number N for the charger. Instead of the example shown in FIG. 13, processing may be performed which determines only whether the amount of data of usage rate U of a charger is sufficient, and applies a difference weight on usage rate U according to a result of the determination. Alternatively, processing may be performed which determines only a magnitude relation between effective number N of a charger and reference number Nc, and applies a difference weight on effective number N according to a result of the determination.

Note that the configuration for charging battery 110 with power supplied external to a vehicle (external charging) is not limited to the configuration of the plug-in charging (contact charging) described above. Battery 110 may be charged according to a non-contact charging method which employs electromagnetic coupling between the vehicle and an external power supply. Specifically, a primary coil is provided on the external power supply side, and a secondary coil is provided on the vehicle side. Utilizing the mutual inductance between the primary coil and the secondary coil, the vehicle is allowed to receive power from the external power supply without contacting it.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A server for providing a plurality of vehicles, each mounted with a power storage device, with charging information for external charging, the server comprising:
   a communication device configured to communicate with the plurality of vehicles; and
   a circuitry configured to generate the charging information,
   the circuitry being configured to:
       obtain an accessible range for a target vehicle among the plurality of vehicles to extract at least one charger within the obtained accessible range, the accessible range being determined by power stored in the power storage device of the target vehicle and a current location of the target vehicle;
       for each of the other of the plurality of vehicles:
           obtain an accessible range of the vehicle;
           calculate, a total number of chargers within the accessible range of the vehicle; and
           calculate, for each of the chargers within the accessible range of the vehicle, a probability of the vehicle visiting the charger, so that the greater the calculated total number of chargers for the vehicle is, the smaller the probability of the vehicle visiting the charger;
       calculate, for each of the chargers, an effective number of vehicles that can use the charger to conduct external charging, by summing each of the probabilities calculated for that charger; and
       calculate an index indicating a potential demand for external charging at each of the chargers based on the effective number, and provide the index to the target vehicle.

2. The server according to claim 1, further comprising a database storing use history of the at least one charger, wherein
   the circuitry calculates the index based on the effective number and the use history.

3. The server according to claim 2, wherein
   the use history includes a usage rate which is a rate of a use period for each of the chargers to a period classified for each predetermined condition, and
   the circuitry calculates the index based on a weighed value of the effective number by a first coefficient and a weighed value of the usage rate by a second coefficient.

4. The server according to claim 3, wherein
   a standard range is provided for the usage rate, the standard range representing a range of the usage rate expected from the effective number, and
   the circuitry is configured to obtain the standard range from the effective number, and when the usage rate is higher than a maximum value of the standard range, the circuitry weighs the usage rate by the second coefficient greater than when the usage rate is within the standard range.

5. The server according to claim 3, wherein
   a standard range is provided for the usage rate, the standard range representing a range of the usage rate expected from the effective number, and
   the circuitry obtains the standard range from the effective number, and when the usage rate is less than a minimum value of the standard range, the circuitry weighs the effective number by the first coefficient greater than when the usage rate is within the standard range.

6. The server according to claim 3, wherein
when a period from which the usage rate data is obtained is shorter than a predetermined period, the circuitry weighs the effective number by the first coefficient greater than when the period is longer than the predetermined period.

7. The server according to claim 3, wherein
when the effective number is less than a predetermined number, the circuitry weighs the usage rate by the second coefficient greater than when the effective number is greater than the predetermined number.

8. A vehicle which is provided with charging information for external charging by a server, the vehicle comprising:
a power storage device; and
a communication device configured to communicate with the server and send to the server information indicating power stored in the power storage device and a current location of the vehicle;
the server is configured to:
obtain an accessible range for the vehicle to extract at least one charger within the obtained accessible range, the accessible range being determined by the power and the current location;
for each of a plurality of other vehicles:
obtain an accessible range of the other vehicle;
calculate, a total number of chargers within the accessible range of the other vehicle; and
calculate, for each of the chargers within the accessible range of the other vehicle, a probability of the other vehicle visiting the charger, so that the greater the calculated total number of chargers for the other vehicle is, the smaller the probability of the other vehicle visiting the charger;
calculate, for each of the chargers, an effective number of vehicles that can use the charger to conduct external charging, by summing each of the probabilities calculated for that charger; and
calculate an index indicating a potential demand for external charging at each of the chargers based on the effective number, and send the index to the vehicle; and
a notification device configured to notify the index to a user of the vehicle.

9. The vehicle according to claim 8, wherein
the notification device includes a display configured to display each of the chargers in an icon according to a magnitude of the index of each of the chargers.

10. A method for providing a plurality of vehicles, each mounted with a power storage device, with charging information for external charging, the method comprising:
obtaining an accessible range for a target vehicle among the plurality of vehicles to extract at least one charger within the obtained accessible range, the accessible range being determined by power stored in the power storage device of the target vehicle and a current location of the target vehicle;
for each of the other of the plurality of vehicles:
obtaining an accessible range of the vehicle;
calculating, a total number of chargers within the accessible range of the vehicle; and
calculating, for each of the chargers within the accessible range of the vehicle, a probability of the vehicle visiting the charger, so that the greater the calculated total number of chargers for the vehicle is, the smaller the probability of the vehicle visiting the charger;
calculating, for each of the chargers, an effective number of vehicles that can use the charger to conduct external charging, by summing each of the probabilities calculated for that charger; and
calculating an index indicating a potential demand for external charging at each of the chargers based on the effective number, and providing the index to the target vehicle.

* * * * *